United States Patent Office 3,409,269
Patented Nov. 5, 1968

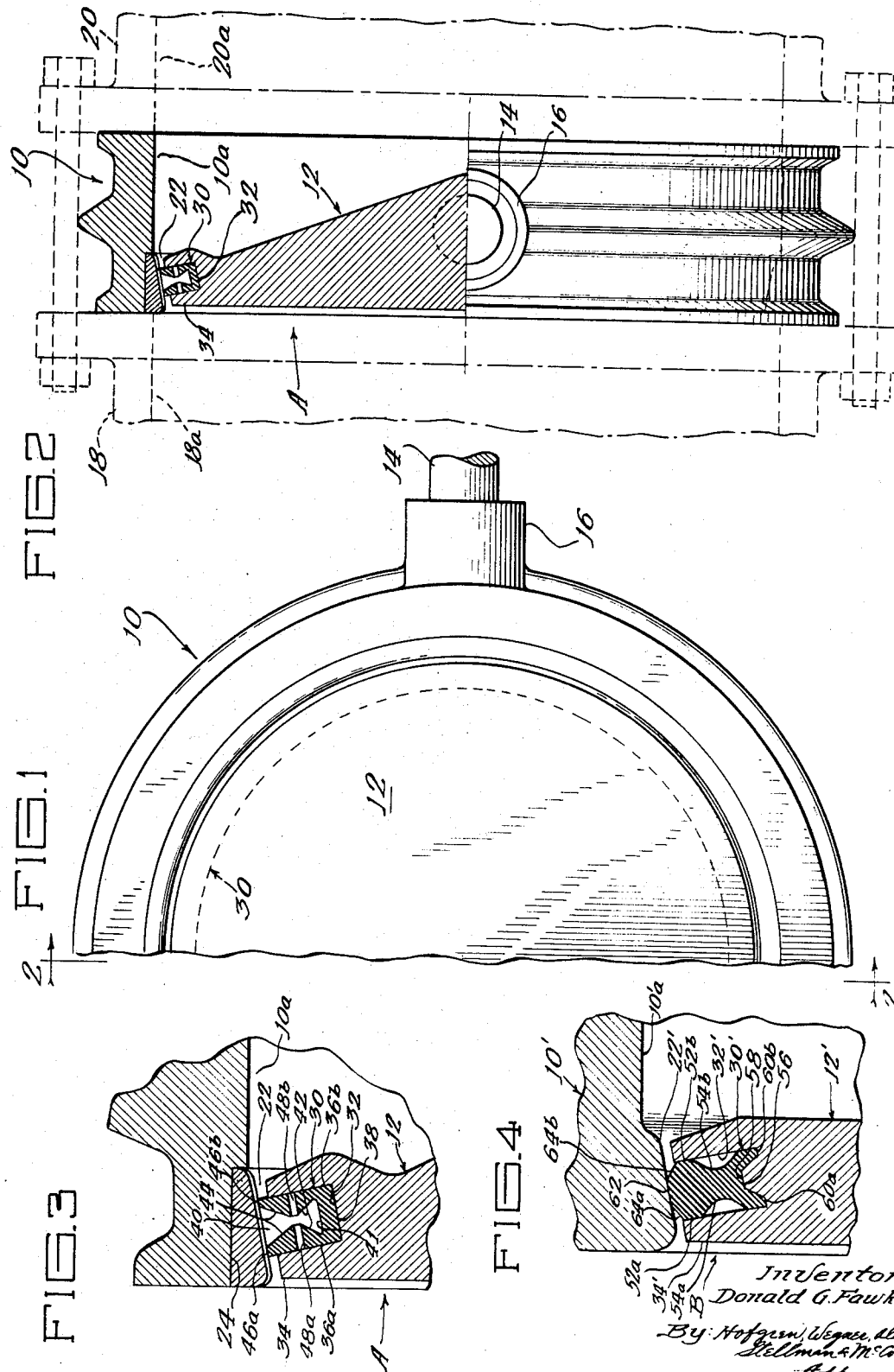

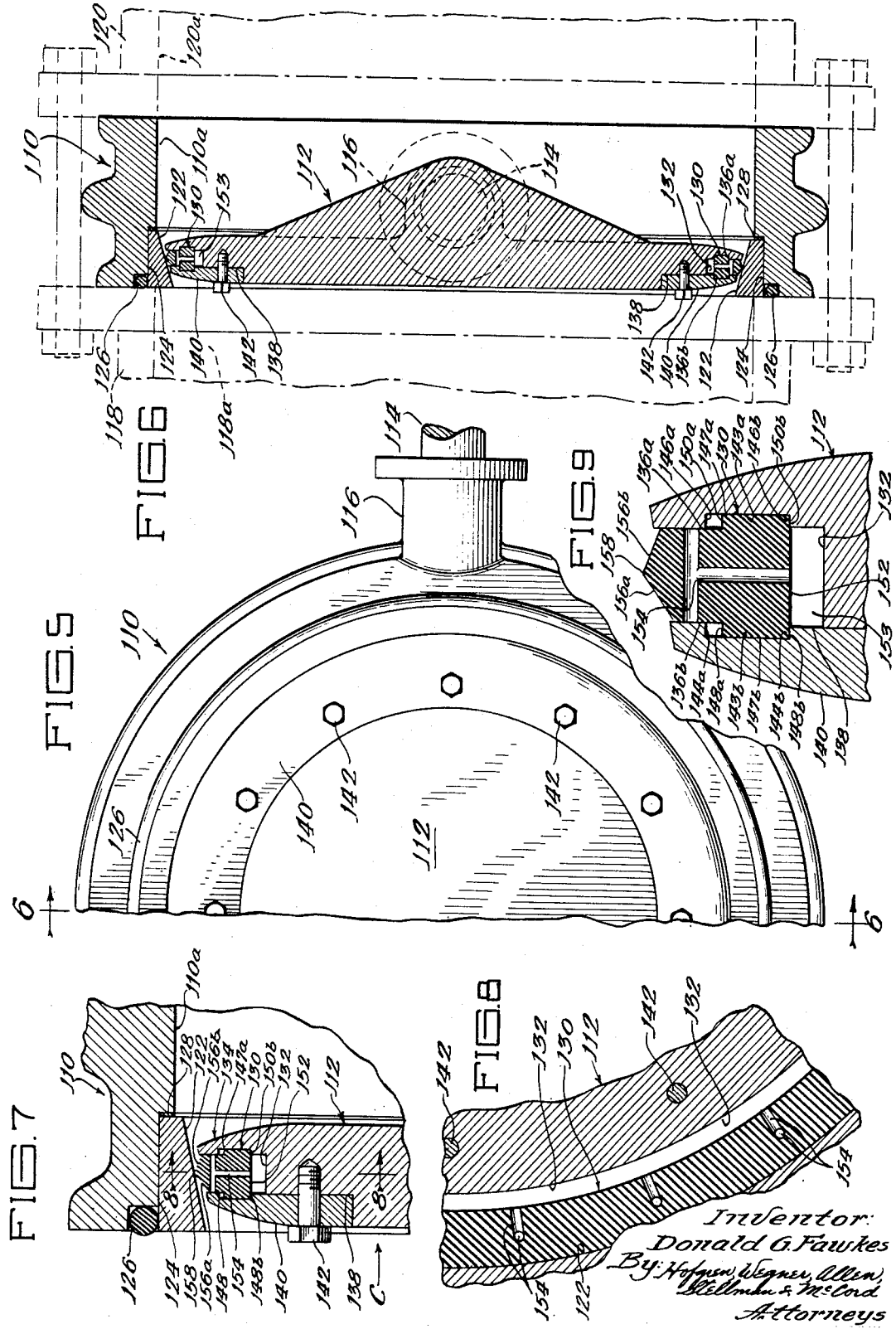

3,409,269
**PRESSURE ACTUATED RESILIENT
SEALS FOR VALVES**
Donald G. Fawkes, Chicago, Ill., assignor to Henry Pratt
Company, a corporation of Illinois
Filed June 21, 1966, Ser. No. 559,322
15 Claims. (Cl. 251—175)

This invention relates to valves and more particularly to an improved sealing structure for rotary valves.

Rotary valves of the type which include a closure member mounted for rotation in a fluid passage on an axis transverse to the longitudinal axis of the fluid passage utilize peripheral engagement between the closure member and the interior of the passage to seal the passage when the valve is in the closed position. Generally a seating surface is formed on one of the valve body or valve disc with a resilient sealing member in the other of the elements for sealing engagement with the seating surface. The resilient sealing member generally has an interference fit relative to the seating surface to insure that the closure member will tightly seal against high pressures which may exist in the line.

For some applications, this type of sealing structure has been found to have certain disadvantages. In extremely high pressure applications, as the pressure in the line is increased, this pressure against the closed valve disc tends to work against the resilient sealing member and tends to move the sealing member away from its sealing engagement with the valve seat. Furthermore, the interference fit creates a binding action when the valve disc is being closed, this binding action beginning with initial movement of the disc away from its 90° displacement relative to the seat. The binding action not only requires greater operating torque to move the valve to the closed position in opposition to the fluid pressure in the line, it also augments the wear on the sealing parts.

Furthermore, many sealing structures for rotary valves are suitable for sealing against pressure only in one direction. This requires that the valve body be initially installed in the fluid line in a predetermined orientation relative to the line. This further means that the valve member will not be usable in situations where the flow in the line may be reversed.

This invention is directed to the provision of a sealing structure for a rotary valve which utilizes the line pressure to assist in creating sealing engagement between the valve closure member and the valve body and which may be utilized to seal against pressure in two directions.

It is therefore a primary object of this invention to provide a new and improved sealing structure for rotary valves.

It is another object of this invention to provide a sealing structure for rotary valves which utilizes line pressure to increase the effectiveness of the sealing engagement between the valve closure member and the seating surface.

Still another object of this invention is to provide an improved sealing structure for a rotary valve wherein there is minimal interference between the sealing surfaces thereby enhancing the life of the sealing members and requiring less operating torque to move the valve closure member to the closed position.

Yet another object of this invention is to provide an improved sealing structure for a rotary valve which seals against fluid pressure in two directions.

Still a further object of this invention is to provide an improved two-way sealing structure for a rotary valve which utilizes line pressure to increase the effectiveness of the seal when the closure member is in the closed position.

Other objects, features and advantages of the present invention will be apparent from the following description of the preferred embodiments illustrated in the accompanying drawings, in which:

FIGURE 1 is a fragmentary elevational view of a rotary valve body of the butterfly valve type;

FIGURE 2 is a section view taken generally along the line 2—2 of FIGURE 1;

FIGURE 3 is an enlarged fragmentary section view showing the relationship between the seating surface of the valve body and the resilient sealing member in the valve closure disc of the structure shown in FIGURE 2;

FIGURE 4 is an enlarged fragmentary view similar to FIGURE 3 but showing a different embodiment of the resilient sealing member of the sealing structure of this invention;

FIGURE 5 is a fragmentary elevational view of a valve body of the butterfly valve type;

FIGURE 6 is a section view taken generally along the line 6—6 of FIGURE 5 showing the valve disc in the closed position relative to the valve body;

FIGURE 7 is a fragmentary enlarged section view of a portion of FIGURE 6 showing in greater detail the seating surface of the valve body and the resilient member carried in the periphery of the valve disc;

FIGURE 8 is a fragmentary enlarged section view taken generally along the line 8—8 of FIGURE 7; and FIGURE 9 is a fragmentary enlarged section view of the periphery of the valve closure member shown in FIGURES 6 and 7.

Rotary valve body 10 is generally provided with a hollow interior 10a defining a fluid passage through the body. A valve closure member 12 is mounted in the body for rotation with a shaft 14 which extends through suitable bearing and sealing structures in trunnions 16 of the valve body 10. The particular valve structure shown herein is a butterfly valve and thus the interior 10a is generally circular cylindrical in configuration and the closure member 12 is generally circular disc-like in configuration.

The body 10 is mounted between conduit elements or pipes 18 and 20 which also have hollow interior portions 18a and 20a providing fluid passages. The valve provides a means for regulating flow through the line established by pipe means 18 and 20 by rotating the closure member 12 between a closed position generally spanning the valve body, as shown in FIGURE 2, and a fully open position generally displaced 90 degrees relative to the position shown in FIGURE 2 (not shown).

In the embodiment shown in FIGURE 4, body 10', interior 10'a and disc 12' have physical characteristics similar to those described with respect to body 10 and disc 12.

For providing sealing engagement between the closure member and valve body, the valve body is provided with a seating surface 22 which may be a separate element bonded in a groove 24 as shown in FIGURE 3, or a machined portion 22' of the interior 10'a as shown in valve 10' in FIGURE 4.

In turn, the closure member is provided with a resilient sealing member 30, as shown in FIGURE 3, or 30a, as shown in FIGURE 4, which resides in a groove 32 or 32a, respectively, formed in the periphery 34 of the valve disc 12 and 12', respectively. When the disc is in the closed position, the resilient sealing member is positioned in sealing engagement with the seating surface of the valve body to completely block the flow of fluid through the line established by the conduits 18 and 20.

Referring particularly to FIGURES 2 and 3, the sealing member 30 is an annular ring of resilient material. The ring has a pair of generally parallel flat outer faces 36a and 36b and a generally flat bottom or base 38 defining the inner periphery of the ring. Preferably member 30 is held in groove 32 by a suitable well-known bonding material applied to base 38 (not shown). An outwardly facing groove 40 in member 30 forms a notch having a bottom 41 generally parallel to the base 38, a pair of opposed convex inside walls which include lower inwardly directed portions 42 and upper outwardly directed portions 44 that terminate at the free peripheral extent of the member 30, forming the spaced seating surfaces 46a and 46b. In addition, lateral passages 48 extend inwardly from each outside wall 36a and 36b and are in communication with the groove 40 in the interior of the ring 30.

As the valve disc 12 is closed as shown in FIGURES 2 and 3, pressure on the upstream side (for example, in conduit 18) will bear against the disc as represented by the arrow A in FIGURES 2 and 3, while pressure on the downstream side (in conduit 20) will decrease, so that in time there will be a pressure differential of relative magnitude on opposite sides of disc 12. Fluid exerting pressure in the direction indicated by the arrow A will flow in the groove 32 in the valve disc along face 36a of ring 30 and enter the notch 40 through the lateral passage 48a. The fluid will then flow against the inside walls 41, 42 and 44. The flow of fluid against walls 42 and 44 generally opposite passage 48 will force the resilient member 30 against the opposite side of the groove 32 with sufficient force to create a static seal between face 36b of the resilient member 30 and the adjacent side of the groove which will prevent the leakage of fluid out the opposite side of the seal towards conduit 20. In addition, the force of fluid against the bottom of the notch 41 will assist in retaining the resilient member in the groove, it being understood that the mechanical bond between the base 38 of the resilient member, and the bottom of the groove 32 is sufficient to normally hold the resilient member in the groove.

In addition, the force of fluid against the inwardly diverging inside walls 42 will create a pressure in the resilient member generally in the direction of the sealing tips 46a and 46b, tending to force these portions into more intimate engagement with the seating surface 22 increasing the effectiveness of the dynamic seal established as the pressure in the line increases.

It should be noted that the structure of the resilient sealing member 30 is such as to afford very small seating surfaces 46a and 46b. As a result, little operator force is necessary to swing the valve disc to a fully closed position. In addition, the structure of this seal permits the seal to be dimensioned relative to the seating surface so that there is a negligible amount of initial interference between the two surfaces than has been normal for similar constructions in the past. This, too, reduces the amount of force necessary to swing the valve disc to the closed position and reduces the wear on the two surfaces, thereby prolonging the life of the structure.

The resilient member 30' shown in the notch 32' of valve disc 12' in FIGURE 4 is also an annular ring of resilient material. The ring has opposed side faces 52a and 52b which are interrupted by annular crescent-shaped grooves 54a and 54b, respectively. The base 56 of the member 30 is notched so that it matingly engages the upraised portion 58 of the bottom of notch 32', thereby forming two downwardly projecting legs 60a and 60b.

The outer peripheral extent of the annular ring 30' is provided with a flat sealing surface 62 which is flanked by beveled faces 64a and 64b that terminate in sides 52a and 52b.

In operation, as fluid pressure is exerted in the direction indicated by the arrow B against beveled face 64a, this will force sealing surface 62 into intimate engagement with the seating surface 22'. In addition, some fluid will enter the groove 32' in the area of side face 52a and will occupy the crescent-shaped groove 54a. Here the fluid will exert pressure in an upward direction which will also tend to force sealing surface 62 against seating surface 22'. In addition, the shape of the groove 54a is such that fluid pressure will also be exerted downwardly, forcing leg 60a into intimate engagement with the bottom of the notch 32', creating a static seal thereat and preventing fluid leakage around the bottom of the notch and out the other side of the valve disc.

As was the case with the structure described in FIGURES 2 and 3, fluid pressure increases will only increase the effectiveness of the seal established by this structure. Also, as can be readily seen, both the embodiments shown in FIGURES 3 and 4 are effective against pressures opposite to those illustrated.

The valve body 110 shown in FIGURES 6 through 8 includes a circular cylindrical interior 110a defining a fluid passage through the body in which a valve closure member or disc 112 is rotatably mounted on shaft 114 extending through trunnions 116. The body is mounted in a fluid line established by conduits or pipes 118 or 120 also having hollow circular cylindrical interiors 118a and 120a. A seating surface 122 resides in a groove 124. An O-ring 126 is lodged in an extension of groove 124 for sealing between body 110 and conduit 118. The opposite side of the seating surface 122 is sealed with a gasket 128. A resilient sealing member 130 is positioned in a stepped recess 132 formed in the peripheral extent 134 of valve disc 112.

Disc 112 has a facial recess 138 adjacent the stepped recess 132 in periphery 134 for receiving a plate 140 which is secured to disc 112 by fastening means 142. Groove 132 and the interior surface of plate 140 have opposed, generally aligned offset cavities 143a and 143b, respectively, forming upper shoulders 144a and 146a, respectively, and lower shoulders 144b and 146b, respectively. In this manner the channel formed by assembly of disc 112 and plate 140 is constructed and arranged to receive the resilient member 130 which has annular facial enlargements 147a and 147b on the opposite faces 136a and 136b, respectively. These annular enlargements form upper shoulders 144a and 150a, respectively, and lower shoulders 148b and 150b, respectively. The distance between shoulders 148b and 150b and the inner periphery 152 of resilient member 130 is less than the distance between shoulders 144b and 146b and the bottom of recess 132 so that there will always be a space 153 between the bottom 152 of member 130 and the bottom of the recess. In addition, the distance between shoulders 144a, 144b and 146a, 146b is greater than the distance between shoulders 148a, 148b and 150a, 150b on the resilient sealing member so that the sealing member may move radially with respect to the valve disc 112 and, therefore, inwardly and outwardly relative to seating surface 122 when the disc is in the closed position.

To provide a means for moving the resilient member 130 relative to disc 112, the resilient member is provided with a T-shaped fluid passage 154 which runs between the opposite faces 136a and 136b of the resilient member above shoulders 144a and 146a and also extends radially outwardly of the inner periphery 152 of the resilient sealing member opening into space 153.

The outer periphery of resilient sealing member 130 has a generally triangular cross sectional configuration with beveled faces 156a and 156b joining in an apex 158 which forms the sealing surface of the resilient sealing member 130.

In operation, when the valve disc is swung to the closed position as shown in FIGURES 6 and 7, fluid pressure emanating from the direction of the arrow C in FIGURE 7 will bear against the beveled face 156a and will enter into recess 132 along side 136b of the resilient sealing member. The fluid will then be conducted in the T-shaped fluid passage 154 downwardly into the space between the bottom of the recess and the inner periphery 152 of the resilient sealing member. Here the fluid pressure will urge the resilient sealing member radially outwardly and thereby urge sealing surface 158 into tight sealing engagement with seating surface 122. In addition, the upper shoulders 148a and 150a of the annular enlargements of the resilient sealing member will be urged into tight sealing engagement with the shoulders 144a and 146a of plate 140 and recess 132 to form a static seal against fluid leakage out the other side of the disc. Increases in line pressure will only serve to increase the effectiveness of the seal.

With this generally functionally symmetrical construction, resilient members can seal against pressure in opposite directions. The sealing surface 158 is very small and little interference with seating surface 122 is necessary, thereby reducing the amount of operator torque necessary to swing the disc between open and closed position and increasing the useful life of the parts.

The foregoing detailed description has been given for clearness of understanding only, and no unnecessary limitations should be understood therefrom, as some modifications may be obvious to those skilled in the art.

I claim:

1. A seal for rotary valves intended for installation in a line carrying fluid under pressure, such valves being of the type having a valve body with a hollow interior defining a fluid passage and a valve closure member rotatably mounted in the interior of said valve body for movement between an open position permitting the flow of fluid therethrough and a closed position spanning the interior of the valve body with the periphery of the closure member in sealing relation with the interior of the valve body, comprising: a resilient sealing ring annular in shape; one of said valve body and said closure member peripheral portion having means forming a sealing surface for cooperative engagement with the sealing ring and the other having wall means forming a channel for reception of the resilient sealing ring; said sealing ring having a base portion mounted in the channel with a part of the ring projecting out of the channel, the latter ring part including a nose portion for continuous path contact with the seating surface and portions on both sides of the nose portion respectively exposed to line pressure on respective sides of the closed closure member when installed and in service, said channel wall means including spaced, generally parallel, opposite side walls extending generally toward and away from the seating surface, said sealing ring having opposite side surfaces mating against said channel side walls for forming a static seal area between such side surface and channel side wall under influence of line pressure, said sealing ring adjacent the nose portion being flexible under line pressure force application to flex away from one channel side wall admitting line pressure into the channel to push upon the sealing ring toward the opposite channel side wall effecting said static seal and also urging the nose portion into sealing engagement with the seating surface.

2. Apparatus as specified in claim 1 wherein the sealing ring has means for exposing a portion of the ring interiorly of the channel to line pressure to establish sealing force on portions of the sealing ring interiorly of the channel.

3. Apparatus as specified in claim 2 wherein the sealing ring has a first surface interiorly of the channel which is opposed to the nose portion, said first surface being exposable to line pressure to force the nose against the valve body seating surface.

4. Apparatus as specified in claim 2 wherein the sealing ring has a second surface interiorly of the channel opposed to an outer side wall of the ring, said second surface being exposable to line pressure to force the side wall against the adjacent channel side wall into a static sealing relation therewith.

5. Apparatus as specified in claim 4 wherein the sealing ring has a first surface interiorly of the channel which is opposed to the nose portion, said first surface being exposable to line pressure to force the nose against the valve body seating surface.

6. Apparatus as specified in claim 5 wherein the first and second surfaces are formed on the opposite side surfaces of the sealing ring and lie adjacent the channel wall.

7. Apparatus as specified in claim 6 wherein the first and second surfaces constitute annular concavities in the opposite side walls of the sealing ring.

8. Apparatus as specified in claim 7 wherein the bottom of the channel has an upstanding rib and wherein the bottom of the sealing ring is bifurcated to straddle the channel rib.

9. Apparatus as specified in claim 5 wherein the sealing ring has fluid passages in the opposite side surfaces for conducting fluid under pressure to the interior of the ring and wherein said first and second surfaces are positioned in the interior ring in the path of fluid flow established by said fluid passages in said ring.

10. Apparatus as specified in claim 9 wherein the ring has an annular peripheral notch forming two opposed interior wall surfaces and two spaced peripheral nose portions, said first and second surfaces being formed in said opposed interior walls.

11. Apparatus as specified in claim 10 wherein the opposed interior walls are convex in cross-sectional configuration, each having a lower upwardly and inwardly extending surface which, when exposed to line pressure of fluid conducted through the fluid passages in the resilient ring forces its respective nose portion against the valve body seating surface, and wherein a second portion of the inside wall extends outwardly and away from said first portion which, when exposed to line pressure, forces the opposite side wall into static sealing engagement with the adjacent channel wall.

12. Apparatus as specified in claim 9 wherein the channel has opposed wall cavities and wherein said ring has facial enlargements in its respective side walls positioned in said cavities for normally holding said ring spaced from the bottom of said channel, and wherein said fluid passage opens to both side surfaces of the annular ring and out the bottom end thereof.

13. Apparatus as specified in claim 12 wherein the cavity recesses are of greater radial dimensions than the ring side wall dimensions to permit relative radial movement of the ring relative to the channel.

14. Apparatus as specified in claim 13 wherein the bottom of the channel side wall recesses is spaced from the bottom of the channel a greater distance than the bottom of the ring side wall enlargement is spaced from the bottom of the ring so that the ring will always be held spaced from the bottom of the channel.

15. Apparatus as specified in claim 14 wherein line pressure acting against the bottom of the annular ring creates a static seal between the channel side wall recesses and the annular ring side wall enlargements.

References Cited

UNITED STATES PATENTS

| | | | |
|---|---|---|---|
| 2,965,354 | 12/1960 | Grove | 251—173 |
| 2,978,222 | 4/1961 | Henrion | 251—175 X |
| 2,987,072 | 6/1961 | Muller | 251—173 X |
| 3,059,897 | 10/1962 | Jensen | 251—306 |
| 3,076,631 | 2/1963 | Grove | 251—317 X |
| 3,250,510 | 5/1966 | Williams | 251—173 |
| 3,260,502 | 7/1966 | Plumer | 251—306 |
| 3,282,558 | 11/1966 | Swain | 251—306 X |

CLARENCE R. GORDON, *Primary Examiner.*